May 29, 1956 — C. DE GANAHL — 2,747,616
PIPE STRUCTURE
Filed July 7, 1951
FIG. 1
FIG. 2
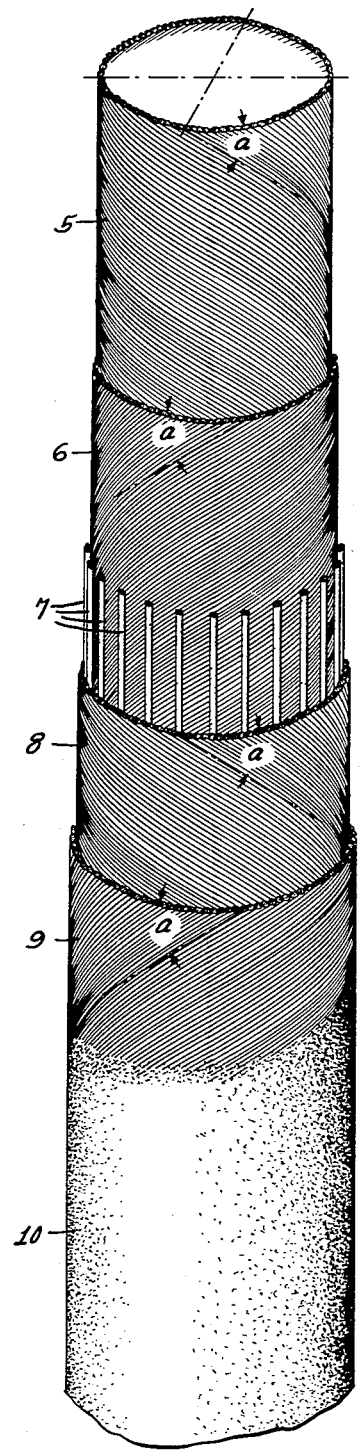
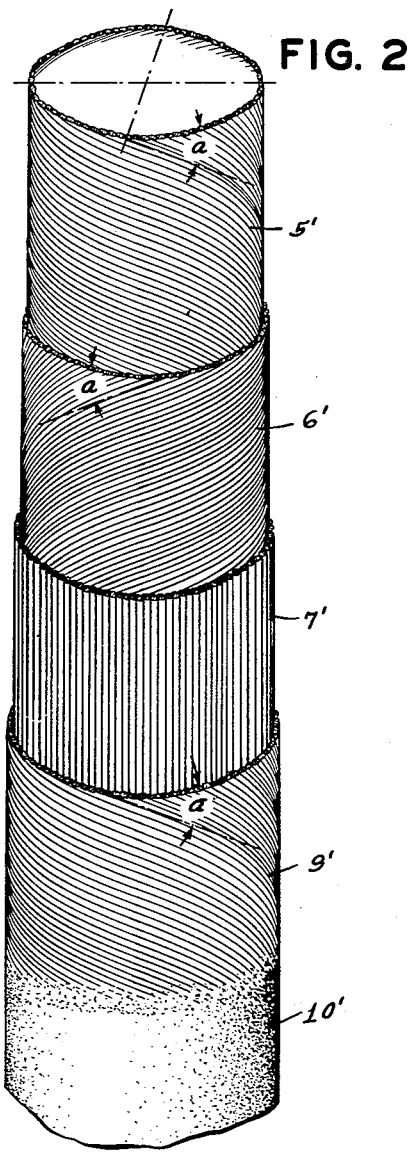
INVENTOR
Carl de Ganahl
ATTORNEYS United States Patent Office 2,747,616
Patented May 29, 1956

2,747,616

PIPE STRUCTURE

Carl de Ganahl, Greenlawn, N. Y.

Application July 7, 1951, Serial No. 235,646

6 Claims. (Cl. 138—55)

This invention relates to the manufacture of pipe, and is concerned particularly with the provision of an improved pipe of the type having a cylindrical wall composed essentially of fiber-reinforced plastic material.

In the copending application of myself and John A. Grant and Clare E. Bacon, Serial No. 180,066, filed August 17, 1950, now Patent No. 2,714,414, issued August 2, 1955, a method is described for making pipe by wrapping glass fiber rovings, which have been impregnated with an unpolymerized plastic composition, helically about a mandrel. The resulting wrapping is treated on the mandrel to set the plastic, and subsequently is withdrawn from the mandrel in the form of a pipe composed essentially of plastic material reinforced by the helical glass fiber rovings embedded therein. Pipe of this character is in general thin-walled, and in commercial lengths is quite flexible. For example, a 20-foot length of 2-inch pipe, when picked up in the middle, will sag considerably at each end under its own weight.

In the course of an exhaustive study of the characteristics of pipe of this character, I have discovered that its rigidity or beam stiffness can be greatly increased by disposing a portion of the fibrous reinforcing rovings longitudinally, parallel to the axis of the pipe. Accordingly, in one of its aspects, the present invention provides a pipe consisting essentially of a multiplicity of fibrous rovings bonded together by and substantially embedded in a monolithic and substantially impervious hollow cylindrical body of plastic material, wherein the fibrous elements are disposed in part helically and in part parallel to the axis of the pipe. The helically disposed fibrous elements are preferably arranged in at least two layers in which the pitches of the helices are opposite in direction, though advantageously equal in magnitude. The fibrous elements which extend longitudinally should be numerous enough and distributed uniformly enough about the axis of the pipe, so that the increased beam stiffness which they contribute is substantially independent of the angular position of the pipe about its axis.

The longitudinally disposed fibrous elements contribute to the strength of the pipe insofar as concerns its ability to resist the longitudinally acting component of internally applied fluid pressure, but, of course, they are quite ineffective for resisting the circumferentially acting (hoop tension) component of such pressure. Neglecting the tensile strength of the plastic material, which is low relative to the fibrous material, this latter component of the fluid pressure must be resisted entirely by the helically applied fibrous elements. I have discovered that for a pipe of this character to have an optimum balance in its ability to resist the circumferentially acting and longitudinally acting components of internally applied fluid pressure, the angle of lay of the helically applied fibrous elements must be correlated with the ratio of the aggregate tensile strength of all the helically disposed fibers to the aggregate tensile strength of all the longitudinally disposed fibers. Based on this finding, a further aspect of the invention is to provide, in a pipe of the character described, that the helically disposed fibrous elements are arranged in the wall of the pipe at an angle $a$ to a plane normal to the axis of the pipe such that $$3 \sin^2 a + \left(\frac{2}{m}\right) \sin a = 1$$

in which $m$ is the ratio of the total cross-sectional area of all the helically disposed fibers to the total cross-sectional area of all the longitudinally disposed fibers. The ratio is here stated as being between the cross-sectional areas of the respectively disposed fibers, because in general the tensile strength of such fibers is in direct proportion to the cross-sectional area. When, as is normally the case, the fibers are applied in the form of a multiplicity of substantially identical rovings, yarns, threads, or the like, $m$ may appropriately be treated as the ratio of the number of helically disposed rovings or the like to the number of longitudinally disposed rovings or the like.

The invention is described in greater detail below with reference to the accompanying drawings, in which two advantageous embodiments of pipes made in accordance with the invention are shown in cut-away perspective.

In the aforesaid copending application Serial No. 180,066, the procedure described for making pipe involves continuously passing a cylindrical mandrel vertically up through an apparatus by which glass fiber rovings are wrapped helically thereon. The apparatus described in said application comprises several horizontal tables arranged to be rotated about the mandrel, each table carrying a number of packages of glass fiber rovings, and the rate of rotation of the tables is correlated with the rate of advance of the mandrel so that the rovings are applied to the mandrel at the desired angle of lay. Some tables rotate in one direction and others in the opposite direction, so that the pitches of the helices of the rovings in different layers are opposite in direction. As described in said application, the rovings are thoroughly impregnated with and coated by an unpolymerized or otherwise unset plastic composition as they are applied to the mandrel. After covering a suitable length of the mandrel with the glass fiber and plastic composition, such mandrel length and the coating thereon is removed from the coating-applying apparatus and is treated to set the plastic; and thereafter, the set composition is removed from the mandrel in the form of a length of pipe whose wall consists essentially of a monolithic hollow cylindrical body of plastic material in which the multiplicity of helically disposed glass fiber rovings are embedded.

Pipe according to the present invention may be made substantially by the method and with apparatus substantially of the character described in the aforesaid application. A characterizing feature of the invention, however, resides in the provision in the pipe structure of a number of longitudinally disposed rovings to impart rigidity, or beam stiffness, to the pipe. These longitudinally arranged rovings may be applied from one or more tables, in the above-described apparatus, which do not rotate relative to the mandrel.

Referring first to Fig. 1, the pipe there shown comprises a plurality of layers 5, 6, 7, 8 and 9 of rovings, yarns, threads, or other filamentary or fibrous bodies of substantial tensile strength. In general, I prefer to employ glass fiber rovings, and henceforth in this specification reference is particularly made to such specific rovings in the manufacture of pipe according to the invention. It is to be understood, however, that the advantages of the invention can be obtained, and the principles which underlie it are applicable to, pipe structures in which other fibrous elements are employed; and consequently such reference is to be considered as by way of example only and not as limiting the scope of the invention.

The rovings which make up the inner pair of layers 5 and 6 are applied helically in closely-spaced, substantially side-by-side relation. The pitches of the helices in these two layers are substantially equal in magnitude but opposite in direction. In the next layer, the glass fiber rovings 7 are arranged longitudinally of the pipe, parallel to its axis. These rovings 7 are rather widely spaced in the form of pipe shown in Fig. 1, but are distributed uniformly about the circumference of the pipe. Finally, in the outer pair of layers 8 and 9, which overlie the longitudinally disposed rovings 7, the rovings again are applied helically in closely spaced relation, and the pitches of the helices in these two layers also are opposite in direction, though advantageously equal in magnitude both to each other and to the pitches of the helices of the rovings in the inner pair of layers 5 and 6. All of the rovings are impregnated with and coated by a polymerized or otherwise set plastic material, so that the rovings are bonded together by such material and are substantially embedded in what amounts to a monolithic substantially impervious cylindrical plastic shell body. The plastic is indicated generally at 10 in Fig. 1.

The form of pipe shown in Fig. 2 of the drawings comprises an inner pair of layers 5' and 6' generally similar to the inner pair of layers 5 and 6 of the pipe shown in Fig. 1. Overlying the layer 6' is a layer 7' of glass fiber rovings extending parallel to the axis of the pipe. As shown in Fig. 2, the layer 7' comprises a large number of rovings spaced closely together, rather than spaced apart as are the longitudinal rovings 7 of Fig. 2. A single helically applied layer 9' of rovings overlies the layer 7' of longitudinal rovings. This outer layer 9' serves primarily to hold the longitudinal rovings in place during manufacture of the pipe, and so the rovings of which it is made may be fewer in number and more widely spaced than in either of the inner pair of layers 5' or 6'. All of the rovings are bonded together by and substantially embedded in a monolithic substantially impervious cylindrical shell body of plastic material indicated generally at 10'.

The plastic material 10 and 10' which forms the substantially impervious cylindrical body in whch the glass fiber rovings are embedded in the pipes of Figs. 1 and 2 may be any natural or synthetic material of the type commonly known by the term "plastic," whether it be thermoplastic or themosetting in character. The plastic material serves to bond the glass fiber rovings together, to render the pipe wall impervious to the passage of fluids, and to contribute compressive strength sufficient to support the fibrous elements of the pipe. While any plastic material can be used to perform these functions more or less well, I find it generally advantageous to employ a composition of styrene and an alkyd resin as the plastic material, because the physical properties of this resin composition are particularly desirable for the most common uses to which pipes are put. It possesses substantial mechanical strength, it is resistant to attack by the fluids most commonly conveyed by pipes, the ingredients are available in quantity at moderate cost, and it lends itself readily to the fabrication of pipe of the character described. Other synthetic resinous materials that may be employed in making pipe according to the invention are the vinyl halide resins and copolymers with vinyl esters, nylon, methacrylate resins, polyethylene, phenol-, urea-, and melamine-formaldehyde condensation polymers, cellulose esters, and various blends of these and other materials. However, it is not essential that the plastic material employed be a synthetic resin. It may instead be a natural product such as a natural wax, resin, or gum for those rather rare and infrequent uses where such materials have advantageous physical properties for the particular use to which the pipe is to be put.

The provision of the longitudinally disposed rovings 7 in Fig. 1 and 7' in Fig. 2 very considerably increases the rigidity or beam stiffness of the pipe as compared with a similar pipe having only helically disposed glass fiber rovings or the like. The degree of rigidity attained is related to the amount of fibrous material employed in these longitudinal rovings. For example, assuming that all of the rovings in the pipes shown in Figs. 1 and 2 are identical, the pipe of Fig. 2 will be substantially more rigid as a beam than the pipe of Fig. 1, because a substantially greater number of its rovings are disposed parallel to the axis of the pipe than is the case with the structure shown in Fig. 1.

As noted above, when a pipe of the character shown in the drawings is subjected internally to fluid pressure, one component of the pressure force acts longitudinally of the pipe, subjecting it to an axial tensile stress, and another component acts circumferentially, subjecting it to a radial bulging force or hoop stress. Ideally, the strength of the pipe for resisting the longitudinal component of such pressure force should be equal to its strength for resisting the circumferential component. The glass fiber rovings contribute to the strength of the pipe solely because of their high tensile strength, whence it is apparent that the helically disposed rovings contribute to the strength of the pipe both as regards its ability to resist the longitudinal component of the pressure force and also as regards its ability to resist the circumferential component of such force, whereas the longitudinally extending rovings contribute to the strength of the pipe only insofar as concerns its ability to resist the longitudinal component of the pressure force. I have found that the angle of lay of the helically applied rovings should be determined on the basis of the number of such rovings relative to the number of longitudinally disposed rovings, the pitch angle being smaller the greater is the number of longitudinally disposed rovings. More explicitly, I have found that in order for the pipe to be ideally strong in its ability to resist equally the longitudinal component of an internally applied fluid pressure and the circumferential component thereof, the angle $a$ (see Fig. 1) which the helically disposed rovings make to a plane normal to the axis of the pipe should be such that $$3 \sin^2 a + \left(\frac{2}{m}\right) \sin a = 1$$

wherein $m$ denotes the ratio of the total cross-sectional area of all the fibers of the helically disposed rovings to the total cross-sectional area of all the fibers of the longitudinally disposed rovings. In its ultimate significance, the ratio $m$ is that of the total tensile strength of all of the helically disposed fibers to the total tensile strength of all of the longitudinally disposed fibers. In general, however, only one type of fiber is used in making up a pipe according to the invention, and the tensile strength of an aggregate of similar fibers is proportional to the total cross-sectional area of all the fibers making up the aggregate. Hence, in general, it is simpler to express the ratio $m$ as that of the cross-sectional area of the helically disposed fibers to the cross-sectional area of the longitudinally disposed fibers. In what is probably the most common case, in which the pipe is made from a multiplicity of substantially identical rovings, yarns, threads, or the like, the ratio $m$ may be much more easily expressed as simply that of the number of helically disposed rovings or the like to the number of longitudinally disposed rovings or the like.

It is of course apparent from the foregoing equation that the larger the ratio $m$ becomes, the smaller will be the second term of the equation and hence the larger will be the sine of the angle $a$ and so the larger will be the angle itself. This of course is as it should be, for it means simply that with a large value of $m$, i. e. with a relatively small number of longitudinally disposed rovings, the pitch of the helically applied rovings must be relatively steep so that these rovings will possess a substantial longitudinal component of direction and therefore be able in themselves to impart a substantial longitudinal component of strength to the pipe. In the pipe shown in Fig. 1, wherein the number of longitudinally disposed rovings 7 is small relative to the number of helically disposed rovings, the angle $a$ should be relatively large; whereas in the pipe of Fig. 2, with its relatively greater number of longitudinally disposed rovings, as compared with the number of helically disposed rovings, the angle $a$ is relatively small.

Of course, the ratio $m$ may vary throughout a very wide range of values—from considerably less than 1 to a very large number, even infinity. The required angle of lay $a$ for any given value of the ratio $m$ is determined by substituting this value for $m$ in the equation and solving the equation for the sine of angle $a$, disregarding, of course, any negative values for sine $a$ that may be obtained. With small values of $m$, from less than 1 to about 10, the angle $a$ is rather sensitively dependent on the actual value of $m$. With larger values of $m$, however (say greater than 10), the angle $a$ approaches its limiting value of 35.26°. The following tabulation, showing the values of the angle $a$ for various values of $m$, illustrates the foregoing:

| $m$ | $\sin a$ | $a$, degrees |
| --- | --- | --- |
| ½ | .2153 | 12.44 |
| 1 | .3333 | 19.47 |
| 2 | .4343 | 25.73 |
| 3 | .4769 | 28.48 |
| 4 | .5000 | 30.00 |
| 5 | .5154 | 31.00 |
| 10 | .5450 | 33.03 |
| 20 | .5525 | 33.54 |
| 100 | .5770 | 35.24 |
| ∞ | .5770 | 35.26 |

The value ½ of the quantity $m$ means that there are twice as many longitudinally disposed rovings as there are helically disposed rovings in the pipe wall; where the value of $m$ is unity, the number of helically disposed rovings is equal to the number of longitudinally disposed rovings; a value of 2 for the quantity $m$ corresponds to a pipe in which the number of longitudinally disposed rovings is half as great as the number of helically disposed rovings; etc. The quantity $m$ is infinite, of course, when there are no longitudinal rovings at all in the pipe structure; and it will be noted from the foregoing tabulation that the angle $a$ is not essentially different, when the value for the quantity $m$ is infinite, than it is for any rather large value for this ratio. Taking into account the engineering tolerances necessarily allowed in the accuracy with which the angle $a$ can be maintained in the commercial manufacture of pipe, it is apparent that in the important case where the number of longitudinal rovings is quite small relative to the number of helically disposed rovings or even when it is equal to zero, i. e. where the value of $m$ is from, say, 50 to infinity, the angle $a$ is substantially 35°.

Referring again to Fig. 1, assume that a total of 24 rovings 7 extend longitudinally of the pipe, and that in each of the layers 5, 6, 8 and 9 there are 48 helically disposed rovings, or a total of 192 helically disposed rovings in the pipe structure. The ratio $m$ then has a value of 192÷24=8, and from the foregoing tabulation it will be apparent that the angle $a$ should be about 32°. Referring to the pipe structure shown in Fig. 2, assume that there are 36 helically disposed rovings in each of the layers 5' and 6', and 24 such rovings in the layer 9' for a total of 96 helically disposed rovings; and assume that 96 longitudinally disposed rovings are employed in the intermediate layer 7'. Then the value for $m$ is 96÷96=1, and from the foregoing tabulation it is seen that the angle $a$ should be approximately 19½°.

The foregoing equation relating the angle $a$ to the ratio $m$ is based on the assumption that all of the helically disposed rovings, in however many layers thereof are employed, are applied at the same angle $a$. This, of course, is the most convenient way in which to make pipe of the character described, for then in making it with the apparatus described in the aforesaid application Serial No. 180,066, all of the roving-carrying tables will be rotated at the same angular velocity about the mandrel (excepting the table or tables from which the longitudinal rovings are applied, which will of course remain stationary).

I claim:

1. A pipe consisting essentially of a multiplicity of fibrous elements bonded together by and substantially embedded in a monolithic and substantially impervious hollow cylindrical body of plastic material, a portion of said fibrous elements being disposed helically and the remainder being disposed longitudinally substantially parallel to the axis of the pipe, said helically disposed fibrous elements being arranged at an angle $a$ to a plane normal to the axis of the pipe such that $$3 \sin^2 a + \left(\frac{2}{m}\right) \sin a = 1$$

in which $m$ is the ratio of the total cross-sectional area of all the fibers of the helically disposed elements to the total cross-sectional area of all the fibers of the longitudinally disposed elements.

2. A pipe consisting essentially of a multiplicity of glass fiber elements bonded together by and substantially embedded in a monolithic and substantially impervious hollow cylindrical body of plastic material, some of said glass fiber elements being disposed helically in at least two layers in which the pitches of the helices are equal in magnitude but opposite in direction and the remainder of said glass fiber elements being disposed longitudinally substantially parallel to the axis of the pipe, said helically disposed elements being arranged at an angle $a$ to a plane normal to the axis of the pipe such that $$3 \sin^2 a + \left(\frac{2}{m}\right) \sin a = 1$$

in which $m$ is the ratio of the total cross-sectional area of all the glass fibers in the helically disposed elements to the total cross sectional area of all of the glass fibers in the longitudinally disposed elements.

3. A pipe consisting essentially of a multiplicity of substantially identical fibrous elements bonded together by and substantially embedded in a monolithic and substantially impervious hollow cylindrical body of plastic material, a portion of said fibrous elements being disposed helically in closely spaced substantially side-by-side relation, and the remainder of said fibrous elements being disposed longitudinally substantially parallel to the axis of the pipe and distributed uniformly about the circumference thereof, said helically disposed elements being arranged at an angle $a$ to a plane normal to the axis of the pipe such that $$3 \sin^2 a + \left(\frac{2}{m}\right) \sin a = 1$$

in which $m$ is the ratio of the number of helically disposed elements to the number of longitudinally disposed elements.

4. A pipe consisting essentially of a multiplicity of substantially identical glass fiber elements bonded together by and substantially embedded in a monolithic and substantially impervious hollow cylindrical body of plastic material, a portion of said glass fiber elements being disposed helically in at least two layers in which the pitches of the helices are substantially equal in magnitude but opposite in direction and in which the glass fiber elements are arranged in closely spaced substantially side-by-side relation, and the remainder of said glass fiber elements being disposed in at least one additional layer in which they extend parallel to the axis of the pipe and in which they are distributed uniformly about the circumference thereof, said helically disposed elements being arranged at an angle $a$ to a plane normal to the axis of the pipe such that $$3 \sin^2 a + \left(\frac{2}{m}\right) \sin a = 1$$

in which $m$ is the ratio of the number of helically disposed elements to the number of longitudinally disposed elements.

5. A pipe consisting essentially of at least one inner layer and at least one outer layer of helically disposed fibrous elements and at least one layer of longitudinally disposed fibrous elements positioned between said inner and outer layers of helically disposed fibrous elements, all of said elements being bonded together by and substantially embedded in a monolithic and substantially impervious hollow cylindrical body of plastic material, the angle $a$ between the helically disposed elements and a plane normal to the axis of the pipe being such that $$3 \sin^2 a + \left(\frac{2}{m}\right) \sin a = 1$$

in which $m$ is the ratio of the total cross-sectional area of the fibers of the helically disposed elements to the total cross-sectional area of the fibers of the longitudinally disposed elements.

6. A pipe consisting essentially of an inner pair of layers of helically disposed glass fiber elements, an intermediate layer of longitudinally disposed glass fiber elements distributed uniformly about the circumference of the pipe and overlying said inner pair of layers, and at least one outer layer of helically disposed glass fiber elements overlying said intermediate layer, all of said elements being bonded together by and substantially embedded in a monolithic and substantially impervious hollow cylindrical body of plastic material, the angle $a$ between each of the helically disposed elements and a plane normal to the axis of the pipe being such that $$3 \sin^2 a + \left(\frac{2}{m}\right) \sin a = 1$$

in which $m$ is the ratio of the number of helically disposed elements to the number of longitudinally disposed elements.

References Cited in the file of this patent

UNITED STATES PATENTS

| | | |
|---|---|---|
| 882,292 | Brown | Mar. 17, 1908 |
| 1,242,903 | Angier | Oct. 16, 1917 |
| 2,467,999 | Stephens | Apr. 19, 1949 |
| 2,476,817 | Charles | July 19, 1949 |
| 2,594,693 | Smith | Apr. 29, 1952 |
| 2,614,058 | Francis | Oct. 14, 1952 |